(12) United States Patent
Ji et al.

(10) Patent No.: US 10,909,854 B2
(45) Date of Patent: Feb. 2, 2021

(54) VEHICLE AND CONTROL METHOD THEREOF

(71) Applicants: HYUNDAI MOTOR COMPANY, Seoul (KR); KIA MOTORS CORPORATION, Seoul (KR)

(72) Inventors: Sungmin Ji, Incheon (KR); Yonjun Jang, Changwon-si (KR); Jaewoong Choi, Seoul (KR); Jong Chul Kim, Suwon-si (KR); HyeongMin Ko, Ansan-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 285 days.

(21) Appl. No.: 16/021,360

(22) Filed: Jun. 28, 2018

(65) Prior Publication Data
US 2019/0259282 A1    Aug. 22, 2019

(30) Foreign Application Priority Data
Feb. 20, 2018  (KR) ........................ 10-2018-0019604

(51) Int. Cl.
*G08G 1/00*   (2006.01)
*G08G 1/16*   (2006.01)
(Continued)

(52) U.S. Cl.
CPC ............ *G08G 1/166* (2013.01); *G01S 13/931* (2013.01); *G08G 1/0112* (2013.01);
(Continued)

(58) Field of Classification Search
CPC .............. G08G 1/166; G08G 1/09675; G08G 1/096783; G08G 1/096716; G08G 1/0116;
(Continued)

(56) References Cited

U.S. PATENT DOCUMENTS

| 9,142,127 B1 * | 9/2015 | McDevitt-Pimbley ..................... H04W 4/90 |
| 2003/0016143 A1 * | 1/2003 | Ghazarian .............. G08G 1/164 340/901 |

(Continued)

FOREIGN PATENT DOCUMENTS

| JP | 2016-222095 A | 12/2016 |
| JP | 2017-073009 A | 4/2017 |

(Continued)

*Primary Examiner* — Shardul D Patel
(74) *Attorney, Agent, or Firm* — Brinks Gilson & Lione (57) ABSTRACT

A vehicle predicts acceleration or deceleration of another vehicle based on the state of a traffic light, and determines the risk of collision based on the predicted acceleration or deceleration of the another vehicle. The vehicle includes a communication device that receives traffic light state information from a road infrastructure, a radar that senses the speed of the another vehicle traveling in a direction intersecting with a traveling direction of the vehicle, and a controller that determines the probability of collision with the another vehicle by using the traffic light state information received by the communication device and the speed information of the another vehicle detected by the radar.

19 Claims, 9 Drawing Sheets

(51) Int. Cl.
*G08G 1/01* (2006.01)
*G08G 1/052* (2006.01)
*G08G 1/04* (2006.01)
*G01S 13/931* (2020.01)
*G08G 1/0967* (2006.01)

(52) U.S. Cl.
CPC ......... *G08G 1/0116* (2013.01); *G08G 1/0133* (2013.01); *G08G 1/04* (2013.01); *G08G 1/052* (2013.01); *G08G 1/09675* (2013.01); *G08G 1/096716* (2013.01); *G08G 1/096783* (2013.01); *G08G 1/163* (2013.01)

(58) Field of Classification Search
CPC ........ G08G 1/052; G08G 1/04; G08G 1/0112; G08G 1/163; G08G 1/0133; G08G 1/00; G01S 13/931; G01S 17/931; G01S 2013/93276; G01S 2013/93277; G01S 13/867; G01S 13/42; G01S 2013/93274; G01S 2013/93272; G01S 2013/93271; G01S 2013/9316; G01S 13/52; B60W 30/18154; B60W 60/0027; B60W 2420/52; B60W 2050/0077; B60W 2555/60; B60W 2554/4042; B60W 30/0953; B60W 30/0956; B60W 30/09; B60W 2554/80
USPC .... 701/117, 118, 36, 45; 340/901, 906, 907, 340/908, 909, 944, 917, 905, 436
See application file for complete search history.

(56) References Cited

U.S. PATENT DOCUMENTS

| | | | |
|---|---|---|---|
| 2005/0012602 A1* | 1/2005 | Knoop | G01S 13/867 340/435 |
| 2006/0181433 A1* | 8/2006 | Wolterman | G08G 1/08 340/917 |
| 2010/0073194 A1* | 3/2010 | Ghazarian | G08G 1/096783 340/901 |
| 2012/0095646 A1* | 4/2012 | Ghazarian | G01S 19/17 701/36 |
| 2013/0194108 A1* | 8/2013 | Lapiotis | G08G 1/096775 340/905 |
| 2014/0307087 A1* | 10/2014 | Evanitsky | G08G 1/052 348/143 |
| 2016/0097849 A1* | 4/2016 | Nichols | G08G 1/096716 342/107 |
| 2017/0174212 A1* | 6/2017 | Gussen | B60W 50/14 |
| 2017/0243485 A1* | 8/2017 | Rubin | H04W 72/005 |
| 2019/0043359 A1* | 2/2019 | Rajakondala | G08G 1/163 |

FOREIGN PATENT DOCUMENTS

| | | |
|---|---|---|
| JP | 2017-111576 A | 6/2017 |
| JP | 2017-174055 A | 9/2017 |
| KR | 10-2017-0086901 A | 7/2017 |
| KR | 10-2017-0090672 A | 8/2017 |

* cited by examiner

VEHICLE AND CONTROL METHOD THEREOF

CROSS-REFERENCE TO RELATED APPLICATION

This application claims the benefit of and priority to Korean Patent Application No. 10-2018-0019604, filed on Feb. 20, 2018, the entire contents of which are incorporated herein by reference.

FIELD

The present disclosure relates to a vehicle capable of increasing the accuracy of a determination on a probability of collision with another vehicle, and a method of controlling the vehicle.

BACKGROUND

The statements in this section merely provide background information related to the present disclosure and may not constitute prior art.

An intersection collision avoidance system is used to prevent a collision with an intersecting vehicle using brakes when a collision with the intersecting vehicle is predicted. Typical technology estimates a collision point based on the speed of the vehicle and the speed of another vehicle at an intersection to determine a collision risk, and brakes the vehicle when the collision risk is high.

However, we have discovered that the typical technology causes the vehicle to brake when no collision occurs actually. It is because it does not consider a situation in which the other vehicle accelerates or decelerates suddenly depending on a traffic light state. In this case, the vehicle is unnecessarily controlled such that safety as well as the accuracy of a collision determination are undermined.

For this reason, we have discovered that technology for predicting an acceleration or deceleration intention of an intersecting vehicle according to a traffic light state, and determining a collision risk in consideration of the acceleration or deceleration intention is desired.

SUMMARY

The present disclosure provides a vehicle capable of increasing the accuracy of a determination on a probability of collision with another vehicle traveling in an intersecting direction, and raising a driver's safety, by predicting an acceleration or deceleration intention of the other vehicle according to a traffic light state and by reflecting the acceleration or deceleration intention of the other vehicle to a determination on collision probability, and a method of controlling the vehicle.

Additional aspects of the disclosure will be set forth in part in the description which follows and, in part, will be obvious from the description, or may be learned by practice of the disclosure.

In one form of the present disclosure, a vehicle includes: a communication device configured to receive traffic light state information from a road infrastructure, a radar configured to sense the speed of another vehicle traveling in an intersecting direction (i.e., a direction intersecting with a traveling direction of the vehicle), and a controller configured to determine the probability of collision with the other vehicle by using the traffic light state information received by the communication device and the speed information of the another vehicle detected by the radar.

The controller may be configured to determine the probability of collision with the another vehicle by predicting the acceleration or deceleration intention of the another vehicle on the basis of the speed change of the other vehicle based on the change of the traffic light state and reflecting the result of predicting the acceleration or deceleration intention of the other vehicle.

The controller may be configured to determine that an amount of acceleration or deceleration of the another vehicle measured when the traffic light is changed to red is greater than an amount of acceleration or deceleration of the other vehicle measured when the traffic light is changed to yellow.

The controller may be configured to set a collision area capable of collision with the another vehicle and predict the acceleration or deceleration intention of the another vehicle in the collision area.

The controller may be configured to calculate the collision prediction point using the speed information of the another vehicle before the communication device receives the traffic light state information.

The controller may be configured to calculate a V2I factor (Vehicle-to-Infrastructure Factor) using a traffic light counter factor having a different increment rate based on the traffic light state and a braking distance factor varying with the speed of the another vehicle, and predict the acceleration or deceleration intention of the another vehicle based on the value of the V2I factor.

The controller may be configured to predict that the another vehicle has an acceleration intention if the value of the V2I factor is a positive value and the another vehicle has a deceleration intention if the value of the V2I factor is negative.

The traffic light counter factor may have a larger increment rate in a certain time interval after the traffic light is changed to red than in a time interval in which the traffic light changes from yellow to red.

The braking distance factor may be proportional to difference between a braking distance according to the speed of the another vehicle and a reaching distance to the collision prediction point of the another vehicle.

The controller may be configured to update the collision prediction point by reflecting a result of predicting the acceleration or deceleration intention of the another vehicle.

The vehicle may further include a warning device configured to provide collision risk information under the control of the controller.

In accordance with another aspect of the present disclosure, a control method of a vehicle includes: receiving, by a communication device of the vehicle, traffic light state information from a road infrastructure; sensing, by a radar, a speed of other vehicle traveling in an intersecting direction; and determining, by a controller, the probability of collision with the other vehicle using the traffic light state information and the speed information of the other vehicle.

The determining the probability of collision with the other vehicle may include: predicting, by the controller, an acceleration or deceleration intention of the other vehicle based on a velocity change of the other vehicle based on a change in the traffic light state; and determining, by the controller, the probability of collision with the other vehicle by reflecting a result of predicting the acceleration or deceleration intention of the other vehicle.

The predicting an acceleration or deceleration intention of the other vehicle may include determining, by the controller, that an amount of acceleration or deceleration of the other vehicle when the traffic light is changed to red is greater than an amount of acceleration or deceleration of the other vehicle when the traffic light is changed to yellow.

The predicting an acceleration or deceleration intention of the other vehicle may further include setting, by the controller, a collision area capable of collision with the other vehicle and predicting the acceleration or deceleration intention of the other vehicle in the collision area.

The method may further include calculating, by the controller, the collision prediction point using the speed information of the other vehicle before the communication device receives the traffic light state information.

The predicting an acceleration or deceleration intention of the other vehicle may further include calculating, by the controller, a V2I factor (Vehicle-to-Infrastructure Factor) using a traffic light counter factor having a different increment rate based on the traffic light state and a braking distance factor varying with the speed of the other vehicle, and predicting, by the controller, the acceleration or deceleration intention of the other vehicle based on the value of the V2I factor.

The predicting an acceleration or deceleration intention of the other vehicle may further include predicting, by the controller, that the other vehicle has an acceleration intention if the value of the V2I factor is a positive value and the other vehicle has a deceleration intention if the value of the V2I factor is negative.

The traffic light counter factor may have a larger increment rate in a certain time interval after the traffic light is changed to red than in a time interval in which the traffic light changes from yellow to red.

The braking distance factor may be proportional to difference between a braking distance according to the speed of the other vehicle 20 and a reaching distance to the collision prediction point of the other vehicle.

The method may further include updating, by the controller, the collision prediction point by reflecting a result of predicting the acceleration or deceleration intention of the other vehicle.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

This specification does not describe all components of forms, and general information in the technical field to which the present disclosure belongs or overlapping information between the forms will not be described. The terms "portion", "module", "member", and "block", as used herein, may be implemented as software or hardware, and according to forms, a plurality of "portions", "modules", "members", or "blocks" may be implemented as a single component, or a single "portion", "module", "member", or "block" may include a plurality of components.

Throughout this specification, when a portion is "connected" to another portion, this includes the case in which the portion is indirectly connected to the other portion, as well as the case in which the portion is directly connected to the other portion, and the indirect connection includes a connection through a wireless communication network.

Also, it will be understood that when the terms "includes," "comprises," "including," and/or "comprising," when used in this specification, specify the presence of a stated component, but do not preclude the presence or addition of one or more other components.

It will be understood that, although the terms first, second, etc. may be used herein to describe various components, these components should not be limited by these terms. These terms are only used to distinguish one component from another.

It is to be understood that the singular forms "a," "an," and "the" include plural referents unless the context clearly dictates otherwise.

Reference numerals used in operations are provided for convenience of description, without describing the order of the operations, and the operations can be executed in a different order from the stated order unless a specific order is definitely specified in the context.

Hereinafter, an operation principle and forms of the present disclosure will be described in detail with reference to the accompanying drawings.

Figure 1:
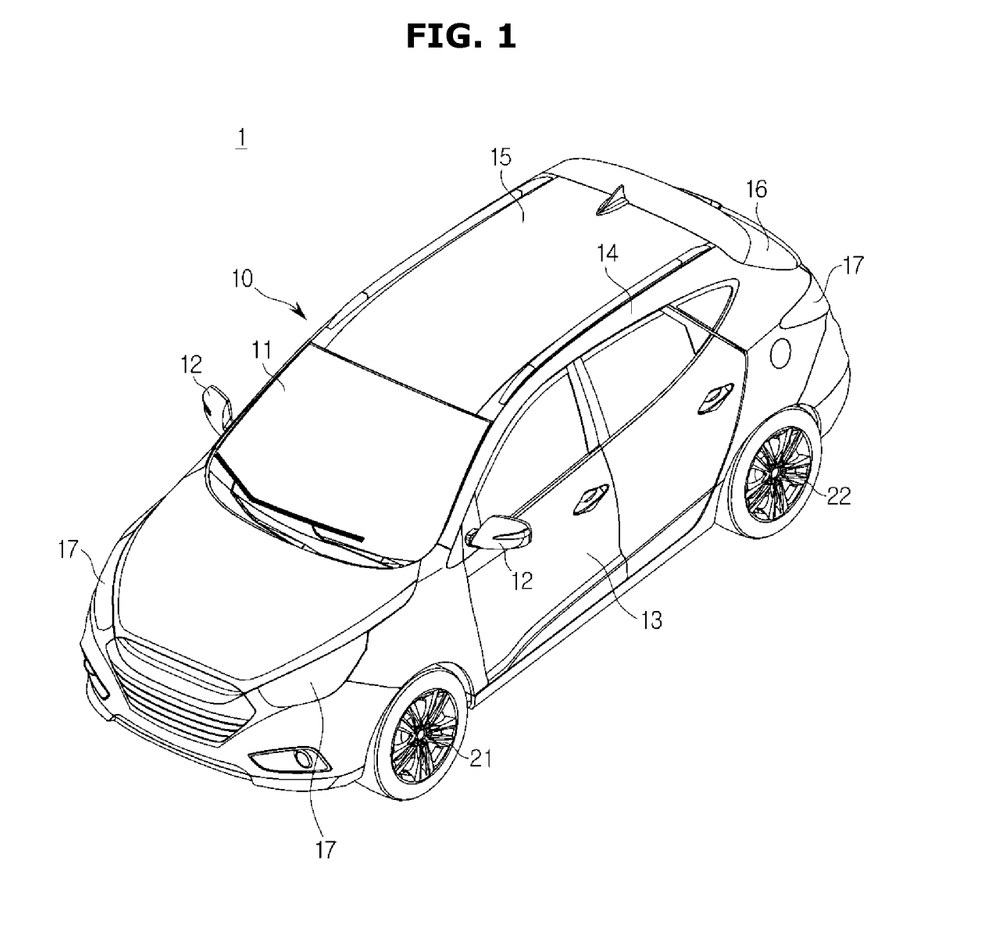
FIG. 1 shows the exterior of a vehicle.
Figure 2:
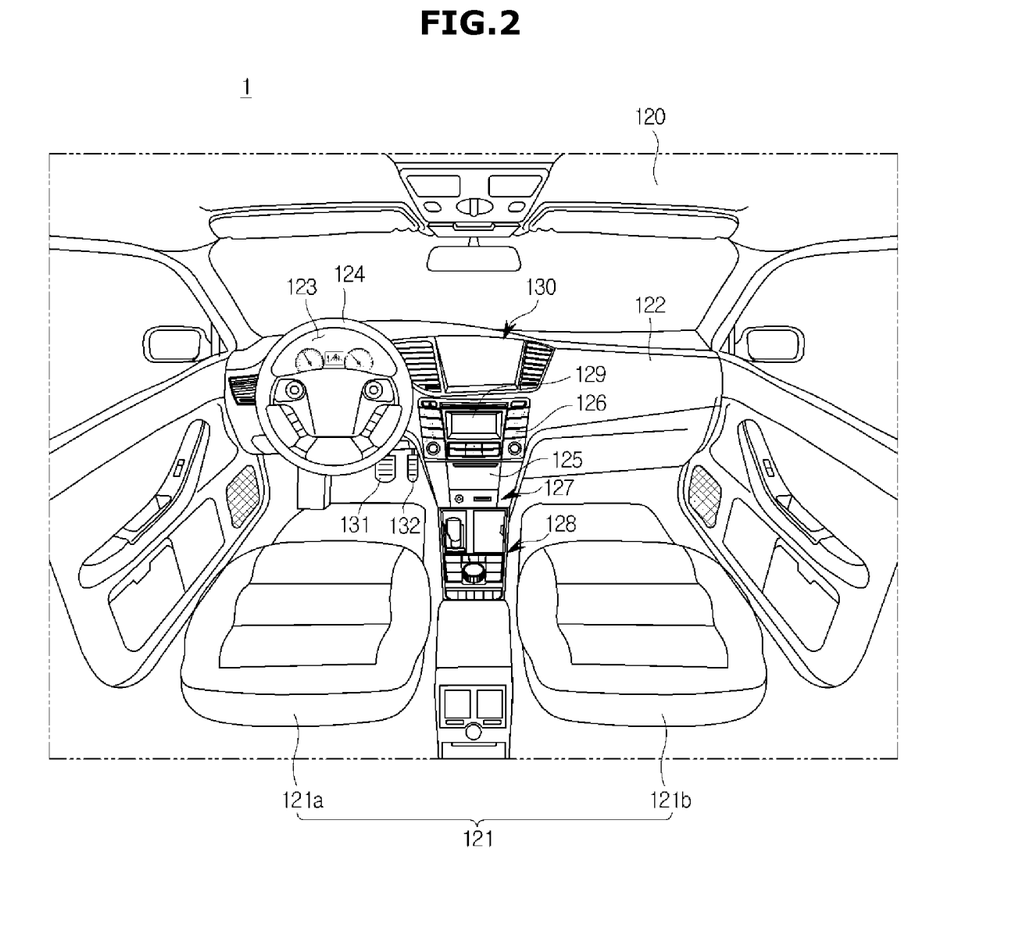
FIG. 2 shows the interior of a vehicle.

FIG. 1 shows the exterior of a vehicle in one form of the present disclosure, and FIG. 2 shows the interior of a vehicle in one form of the present disclosure.

Referring to FIG. 1, a vehicle 1 may include: a main body 10 forming the outer appearance of the vehicle 1, a windscreen 11 configured to provide a driver with a front view of the vehicle 1, a plurality of side-view mirrors 12 configured to provide the driver with side and rear views of the vehicle 1, a plurality of doors 13 configured to shield the inside of the vehicle 1 from the outside, a roof panel 15, a plurality of fillers 14 configured to support the roof panel 15, a rear window glass 16, a plurality of turn signals 17, a plurality of front wheels 21 disposed in a front portion of the vehicle 1, and a plurality of rear wheels 22 disposed in a rear portion of the vehicle 1, wherein the front wheels 21 and the rear wheels 33 are collectively referred to as wheels.

The windscreen 11 may be disposed in the front upper portion of the main body 10 to enable the driver inside the vehicle 1 to acquire visual information of a front view of the vehicle 1. Also, the side-view mirrors 12 may include a left side-view mirror disposed to the left of the main body 10 and a right side-view mirror disposed to the right of the main body 10 so that the driver inside the vehicle 1 can acquire visual information about side and rear views of the vehicle 1.

The doors 13 may be rotatably provided to the left and right of the main body 10 to allow the driver to open one of them and get into the vehicle 1. Also, the doors 13 may shield the interior of the vehicle 1 from the outside when all of them close.

A chassis of the vehicle 1 may include a power generation system, a power transfer system, a driving system, a steering system, a brake system, an acceleration system, a suspension system, a transmission system, a fuel system, and front, rear, left, and right wheels. Also, the vehicle 1 may include various safety systems for a driver and passengers' safety. As an example of the brake system, a brake pedal 131 may be installed in the inside of the vehicle 1, and as an example of the acceleration system, an accelerator pedal 132 may be installed in the inside of the vehicle 1.

The safety systems of the vehicle 1 may include an airbag system to secure a driver and passengers' safety upon collision, and an Electronic Stability Control (ESC) system to avoid loss of control of the vehicle 1 when the vehicle 1 accelerates or corners.

The vehicle 1 may include an Electronic Control Unit (ECU) to control the driving of the power generation system, the power transfer system, the driving system, the steering system, the brake system, the suspension system, the transmission system, the fuel system, the various safety systems, and the sensors.

Also, the vehicle 1 may include various kinds of sensors 300. For example, the vehicle 1 may include a proximity sensor for sensing an obstacle or another vehicle in the front, rear, or side of the vehicle 1, a rain sensor for determining whether it rains and sensing an amount of rainfall, a speed sensor for detecting speed of the wheels 21 and 22 of the vehicle 1, a lateral acceleration sensor for detecting lateral acceleration of the vehicle 1, a yaw rate sensor for detecting a change in angular speed of the vehicle 1, a gyro sensor, and a direction sensor for detecting a rotation of a steering wheel and a driving direction of the vehicle 1.

In addition, the vehicle 1 may include a plurality of sensors 300 for sensing objects located at the front, side, and rear of the vehicle 1 to generate data or image. For example, the vehicle 1 may include a radar 310 for sensing objects in the vicinity of the vehicle 1, and a camera 320 for photographing surroundings of the vehicle 1 to generate image data.

The radar 310 or the camera 320 may be installed in a front radiator grill or a front head lamp of the vehicle 1. Also, the radar 310 or the camera 320 may be integrated into a heating wire in a rear portion of the roof panel 15, that is, an upper portion of the rear window glass 16. That is, the radar 310 or the camera 320 may be installed at an arbitrary location.

The sensors 300 may include a sensor for measuring a distance to an object at regular time intervals, such as a laser sensor, an infrared sensor, a radar sensor 230, and a LiDAR sensor. The LiDAR sensor may scan, when the vehicle 1 travels, the surfaces of objects in a scanning area in real time to acquire information about the surfaces of the objects. The LiDAR sensor may radiate laser, and detect laser reflected from a target object to sense a distance to the target object, a direction to the target object, speed of the target object, temperature of the target object, a material distribution of the target object, a concentration property of the target object, etc. The LiDAR sensor may scan the target object by sampling the surface of the target object, and output sampled point data.

Referring to FIG. 2, the interior 120 of the main body 10 may include a plurality of seats 121 (121a and 121b) on which passengers sit, a dashboard 122, an instrument panel (that is, a cluster 123) which is disposed on the dashboard 122 and on which a tachometer, a speedometer, a coolant thermometer, a fuel gauge, a turn signal indicator light, a high beam indicator light, a warning light, a seat belt warning light, an odometer, a traveling recorder, an automatic transmission lever indicator light, a door open warning light, an engine oil warning light, a fuel warning light, etc. are mounted, a steering wheel 124 for enabling the driver to change a moving direction of the vehicle 1, and a center fascia 125 on which an audio system and a control panel of an air conditioner are mounted.

The seats 121 may include a driver seat 121a on which a driver sits, a passenger seat 121b on which a passenger sits, and a back seat that is provided in the back inside the vehicle 1.

The cluster 123 may be implemented in a digital fashion. That is, the cluster 123 implemented in the digital fashion may display information of the vehicle 1 and driving information as images.

The center fascia 125 may include a head unit 126 disposed in the dashboard 122 between the driver seat 121a and the passenger seat 121b, and configured to control the audio system, the air conditioner, and seat heaters. The head unit 126 may include a plurality of buttons to receive commands for operating the audio system, the air conditioner, and the seat heaters.

In the center fascia 125, a vent, a cigar jack, a multi-terminal 127, etc. may be installed. The multi-terminal 127 may be disposed adjacent to the heat unit 126, and further include a USB port, an AUX terminal, and a SD slot.

The vehicle 1 may further include an input device 128 for receiving commands for performing various functions, and a display 129 for displaying information about a function being performed and information input by a user.

The input device 128 may be mounted on at least one of the head unit 126 and the center fascia 125, and include at least one physical button, such as on/off buttons for executing or stopping various functions, buttons for changing setting values of the various functions, etc. The input device 128 may transmit operating signals of the buttons to the ECU, a controller 500 in the head unit 126, or an Audio Video Navigation (AVN) system 130.

The input device 128 may include a touch panel integrated into a display of the AVN system 130. The input device 128 may be in the form of buttons and displayed on the display of the AVN system 130, and in this case, the input device 128 may receive position information of the displayed buttons.

The input device 128 may further include a jog dial (not shown) or a touch pad for receiving a command for moving or selecting a cursor displayed on the display of the AVN system 130. The jog dial or the touch pad may be positioned on the center fascia, etc.

More specifically, the input device 128 may receive a user input of selecting one of an autonomous driving mode and a manual driving mode in which a driver drives the vehicle. If the input device 128 receives a user input of selecting the autonomous driving mode, the input device 128 may transmit an input signal of the autonomous driving mode to a controller 400.

The controller 400 may distribute signals to components in the vehicle 1, and also transfer control signals for the components in the vehicle 1 to the individual components. The controller may be an ECU. The term "controller" is used to be interpreted in a broad sense, and it is not limited by the terminology.

Also, when a navigation function is selected, the input device 128 may receive information of a destination, and transmit the information of the destination to the AVN system 130. When a Digital Multimedia Broadcasting (DMB) function is selected, the input device 128 may receive channel and volume information, and transmit the channel and volume information to the AVN system 130.

The display panel of the display 128 may be a Light Emitting Diode (LED) panel, an Organic Light Emitting Diode (OLED) panel, or a Liquid Crystal Display (LCD) panel.

In the center fascia 126, the AVN system 130 may be provided to receive information from the user, and output results corresponding to the received information. The AVN system 130 may perform at least one function among the navigation function, the DMB function, an audio function, and a video function, and display driving information and environment information of a road in the autonomous driving mode. The AVN system 30 may stand on the dashboard 122.

Also, the vehicle 1 may optionally include various electronic apparatuses, such as a hands-free system for improving a driver's convenience, a Global Positioning System (GPS), an audio system, a Bluetooth device, a rear camera, a charging apparatus for a terminal, and a High-pass apparatus.

The vehicle 1 may further include a start button for inputting an operation command to a start motor (not shown). That is, when the start button is turned on, the vehicle 1 may operate the start motor (not shown), and drive an engine (not shown) which is a power generating apparatus.

The vehicle 1 may further include a battery (not shown) electrically connected to the terminal, the audio system, the indoor lamp, the start motor, and the other electronic devices to supply driving power to them. The battery may perform charging using its own generator or power of the engine during driving.

Figure 3:
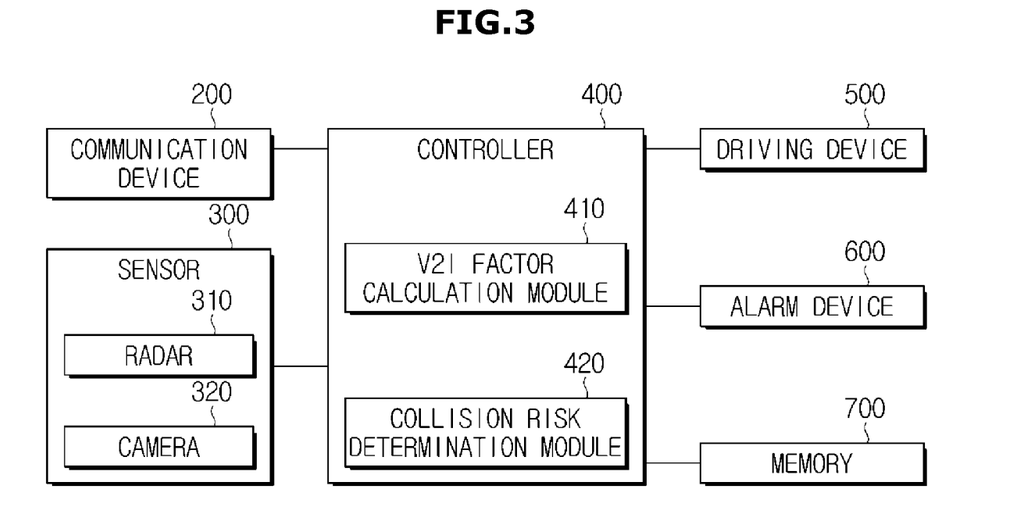
FIG. 3 is a block diagram of some components of a vehicle.

FIG. 3 is a control block diagram of a vehicle in one form of the present disclosure.

Referring to FIG. 3, the vehicle 1 may include a communication device 200, a sensor 300 such as a radar 310 or/and a camera 320, a controller 400, a driving device 500, and a warning device 600. The vehicle 1 may also include a memory 700 for storing data generated by the sensor 300.

The communication device 200 may transmit/receive lighting state information of a traffic light to/from a road infrastructure. The communication device 200 may transmit and receive data between components existing on a road. For example, the communication device 200 can transmit and receive data between vehicles (Vehicle to Vehicle (V2V)), between vehicles and road infrastructures (Vehicle to Infrastructure (V2I)), and between vehicles and pedestrians or personal terminals (Vehicle to Pedestrian (V2P)). The communication device 200 may perform data transmission/reception using a wireless network.

Traffic light state information received by the communication device 200 from the road infrastructure may include a lighting state of the traffic light, a traffic light change time, etc.

The radar 310 may detect surrounding objects, and generate object data. For example, the radar 310 may detect another vehicle traveling in a direction of intersecting a direction in which the vehicle 1 travels, to generate data of the other vehicle. The radar 310 may emit electromagnetic waves, and receive electromagnetic waves reflected from an object within a measurement area to thereby measure a distance to the object. In addition, the radar 310 may measure spatial coordinates of an object to collect three-dimensional information of the object. Further, the radar 310 may measure speed of a nearby object.

The camera 320 may photograph surroundings to generate image data. That is, the camera 320 may photograph surroundings to acquire an image of a nearby object. The camera 320 may acquire images of other vehicles and the surrounding environment existing in the front, rear, and sides of the vehicle 1, and may acquire images of a road on which the vehicle 1 travels.

The controller 400 may determine a probability of collision with another vehicle traveling in a direction of intersecting the direction in which the vehicle 1 travels based on traffic light state information received from a road infrastructure and speed information of the other vehicle. The controller 400 may predict an acceleration or deceleration intention of the other vehicle based on a change in speed of the other vehicle according to a change in state of the traffic light, and determine a probability of collision with the other vehicle in consideration of the predicted acceleration or deceleration intention of the other vehicle. The controller 400 may determine that acceleration or deceleration of the other vehicle when the traffic light changes to red is greater than acceleration or deceleration of the other vehicle when the traffic light changes to yellow.

Specifically, the controller 400 may include a V2I factor calculation module 410 and a collision risk determination module 420. The V2I factor calculation module 410 may calculate a V2I factor to predict an acceleration or deceleration intention of another vehicle. The collision risk determination module 420 may set a collision area, and calculate a time at which another vehicle enters the collision area and a time at which the other vehicle departs from the collision area to thereby determine a collision risk. A method of calculating the V2I factor and a method of determining the collision risk will be described in detail with reference to FIGS. 4 to 8, below.

The driving device 500 may receive a control signal from the controller 400 to operate the steering wheel 124, the brake pedal 131, the accelerator pedal 132, etc., thereby controlling the vehicle 1.

The warning device 600 (e.g., an alarm device) may provide collision risk information under the control of the controller 400. The warning device 600 may stimulate at least one of a driver's visual, auditory, and tactile senses to provide the driver with collision risk information. For example, the warning device 600 may visually and audibly transmit danger information to the driver through the AVN device 130 installed in the vehicle 1.

Figure 4:
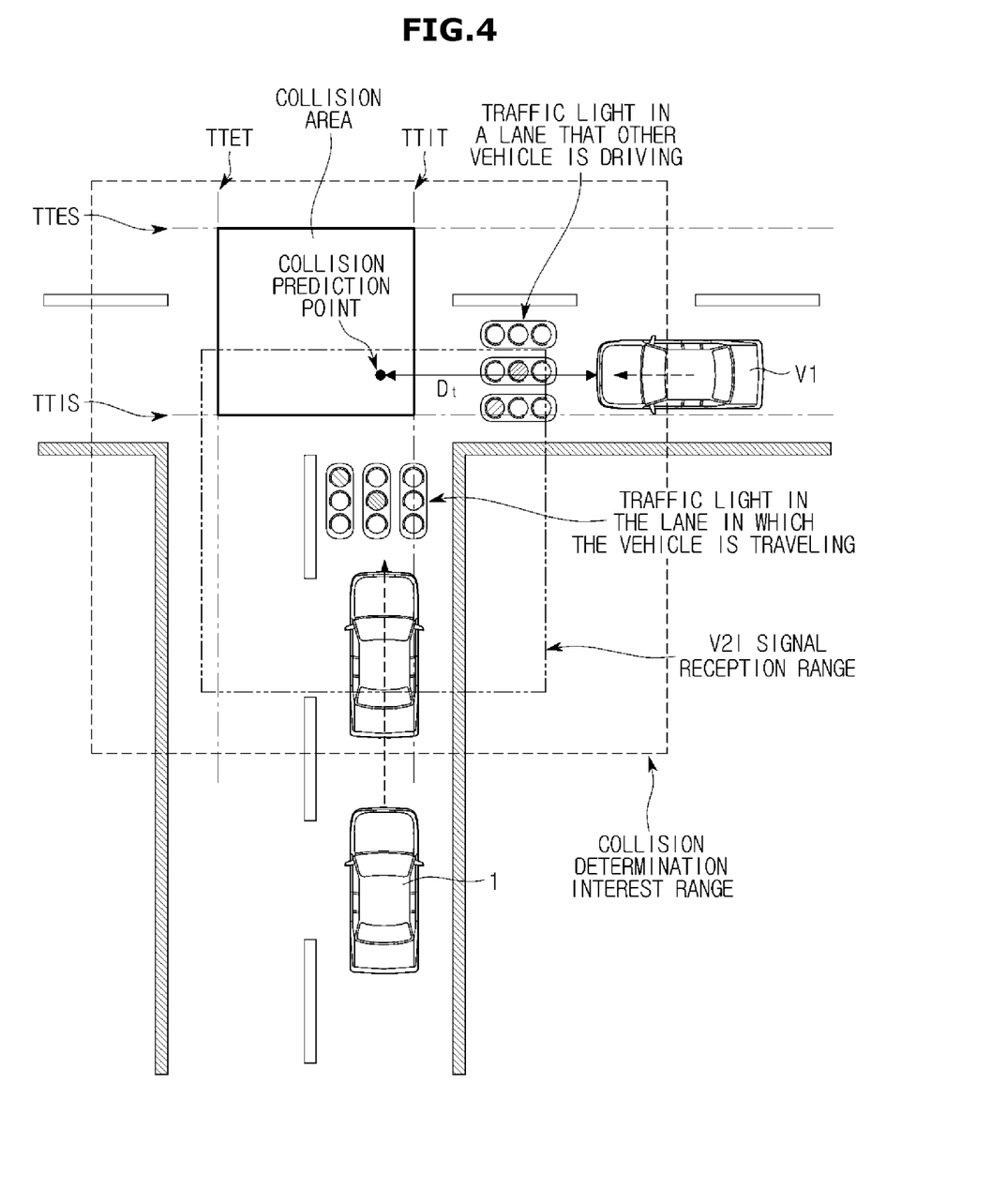
FIG. 4 shows an example in which the vehicle determines the risk of collision at an intersection.

FIG. 4 shows an example to determine a collision risk at an intersection in one form of the present disclosure.

Referring to FIG. 4, the radar 310 of the vehicle 1 may sense another vehicle V1 traveling in a direction of intersecting a traveling direction of the vehicle 1 within a sensing area. The controller 400 may receive data of the another vehicle V1 from the radar 310, and determine that there is a collision risk, if the another vehicle V1 enters an area of interest in a collision determination. That is, the controller 400 may calculate a collision prediction point based on speed information of the vehicle 1 and speed information of the another vehicle V1 to determine a collision probability, before receiving traffic light state information. The controller 400 may also set a collision area in which the vehicle 1 may collide with the another vehicle V1, and calculate a distance $D_t$ by which the another vehicle V1 arrives at the collision prediction point.

When the vehicle 1 is within an area in which it can receive signals from the road infrastructure, the communication device 200 may receive traffic light state information from the road infrastructure, and transmit the traffic light state information to the controller 400

As described above, the controller 400 may include the V2I factor calculation module 410 and the collision risk determination module 420. The V2I factor calculation module 410 may predict an acceleration or deceleration intention of the another vehicle V1 based on received traffic light state information and speed change information of the another vehicle V1. The collision risk determination module 420 may update the collision prediction point in consideration of the predicted acceleration or deceleration intention of the another vehicle V1.

The V2I factor calculation module 410 may determine that an amount of acceleration or deceleration of the another vehicle V1 when a traffic light changes to red is greater than an amount of acceleration or deceleration of the another vehicle V1 when the traffic light changes to yellow.

Figure 6:
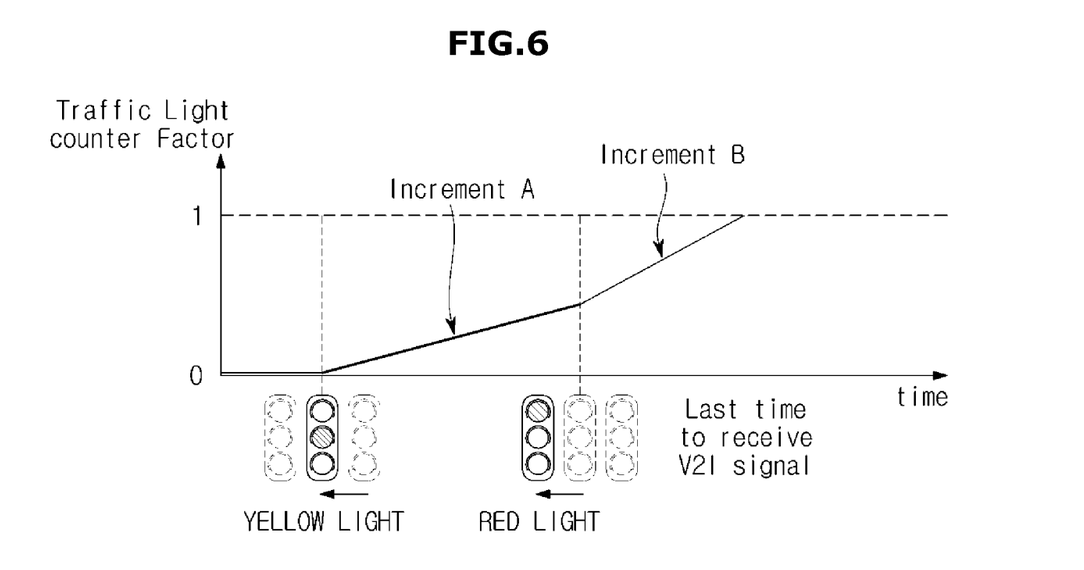
FIG. 6 is a graph for explaining a traffic light counter factor used in the V2I factor calculation.
Figure 7:
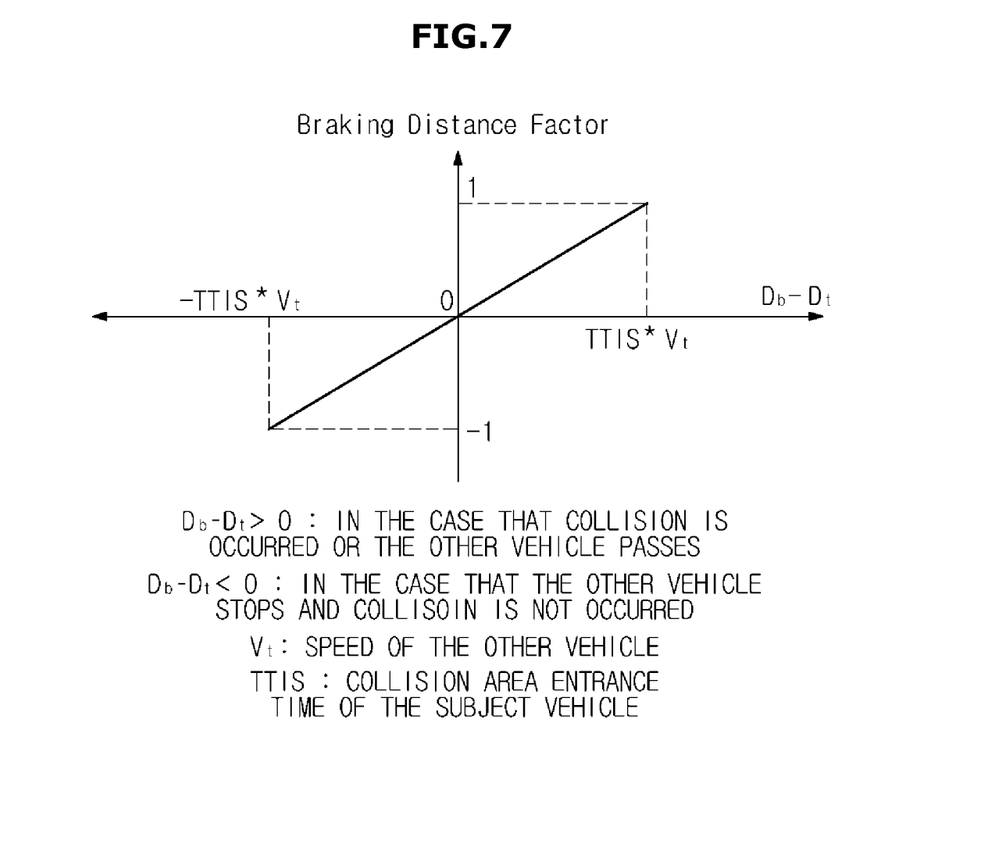
FIG. 7 is a graph for explaining a braking distance factor used in the calculation of the V2I factor.

The acceleration or deceleration intention of the another vehicle V1 may be predicted using a V2I factor. The V2I factor calculation module 410 may calculate a V2I factor using a traffic light counter factor having different increment rates according to traffic light states and a braking distance factor varying with speed of the another vehicle V1. The V2I factor calculation module 410 may predict that the another vehicle V1 has an acceleration intention, if the V2I factor has a positive (+) value, and that the another vehicle V1 has a deceleration intention, if the V2I factor has a negative (−) value. FIGS. 6 and 7 are views for describing a traffic light counter factor and a braking distance factor, respectively.

In FIG. 4, TTIS represents a time when the vehicle 1 enters a collision area, and TTES represents a time when the vehicle 1 departs from the collision area. Also, TTIT represents a time when the another vehicle V1 enters the collision area, and TTET represents a time when the another vehicle V1 departs from the collision area. The time of entrance to the collision area may be calculated using speed information of the vehicle 1 or the another vehicle V1 and a distance to a collision area entrance point. The time of departure from the collision area may be calculated using a sum of the distance to the collision area entrance point and a length of the vehicle 1 or the other vehicle V1 and the speed information of the vehicle 1 or the another vehicle V2. The collision area entrance point may be a point at which lanes intersect.

The collision risk determination module 420 may determine a collision probability by calculating times when the vehicle 1 and the another vehicle V1 enter the collision area and times when the vehicle 1 and the another vehicle V1 depart from the collision area. The collision risk determination module 420 may determine that there is a collision possibility when the vehicle 1 and the another vehicle V1 stay in the collision area at the same time. If the collision risk determination module 420 reflects an acceleration or deceleration intention of the another vehicle V1 to a determination on a collision probability, the time TTIT at which the another vehicle V1 enters the collision area and the time TTET at which the another vehicle V1 departs from the collision area may change. In this case, a determination on a collision probability may vary.

Figure 5A:
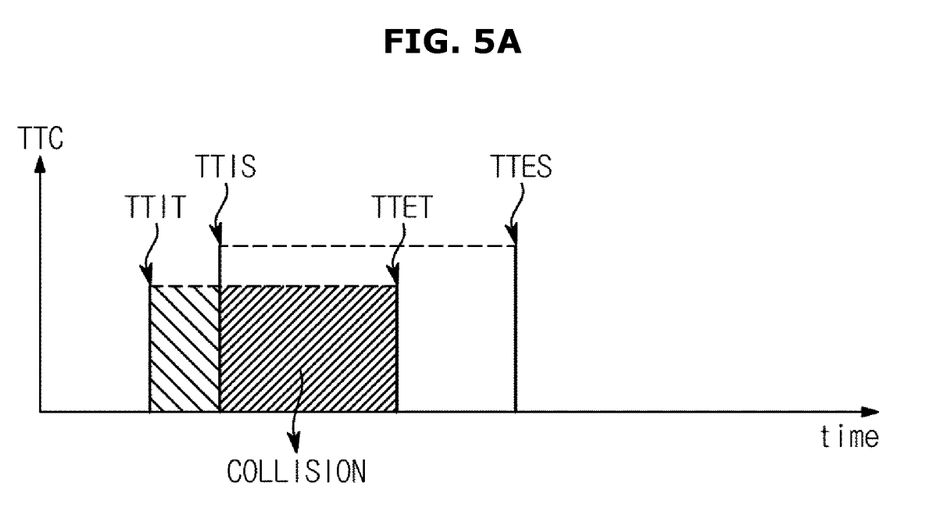
FIGS. 5A and 5B are graphs for explaining a method for determining a risk of collision by reflecting a V2I factor.
Figure 5B:
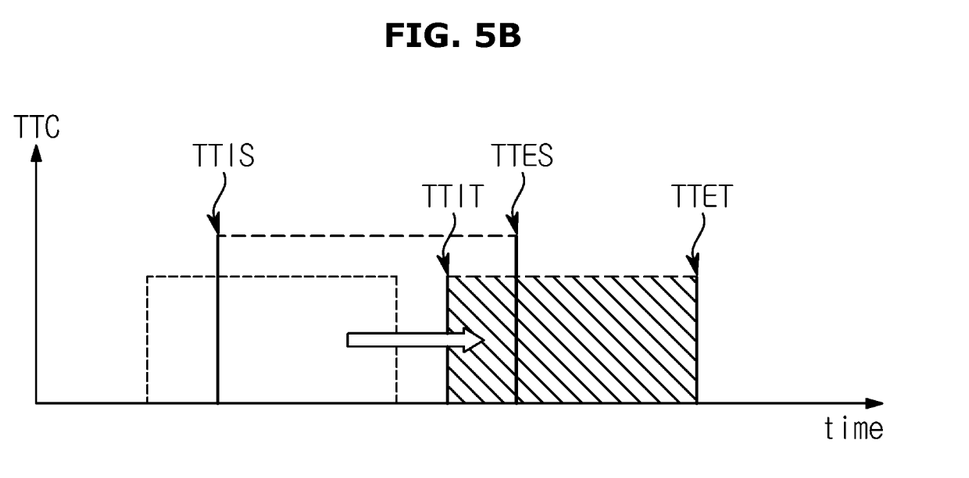

FIGS. 5A and 5B are graphs for describing a method in which a vehicle reflects a V2I factor to determine a collision risk in one form of the present disclosure. FIG. 5A shows a case of calculating a time-to-collision (TTC) without reflecting an acceleration or deceleration intention of another vehicle V1 according to a traffic light state, and FIG. 5B shows a case of calculating a time-to-collision by reflecting an acceleration or deceleration intention of another vehicle V1.

Referring to FIG. 5A, a collision area entrance time TTIT of the other vehicle V1 is earlier than a collision area entrance time TTIS of the vehicle 1, and a collision area departure time TTET of the other vehicle V1 is later than the collision area entrance time TTIS of the vehicle 1. In this case, there may be a probability that the vehicle 1 collides with the other vehicle V1 when the vehicle 1 enters the collision area. Accordingly, the controller 400 may transmit a control signal to the driving device 600, and the driving device 600 may brake the vehicle 1. The collision area entrance time TTIT and the collision area departure time TTET of the other vehicle V1 may be calculated by Equation 1, below.

$TTIT$=Distance to collision area entrance point/speed of other vehicle $TTET$=(Distance to collision area entrance point+ length of other vehicle)/speed of other vehicle [Equation 1]

Referring to FIG. 5B, it is confirmed that the collision area entrance time TTIT of the other vehicle V1 is calculated to be later than the collision area entrance time TTIS of the vehicle 1. The reason is because a V2I factor is reflected. For example, when the other vehicle V1 recognizes a yellow traffic light and suddenly decelerates, a V2I factor may be calculated as −0.2. That is, when the other vehicle V1 recognizes the yellow traffic light and suddenly decelerates, the collision area entrance time TTIT of the other vehicle V1 may be delayed. In this case, the vehicle 1 may enter the collision area earlier than the other vehicle V1. Therefore, the controller 400 may determine that there is no collision probability, and generate no vehicle control signal. The collision area entrance time TTIT and the collision area departure time TTET of the other vehicle V1 when the V2I factor is reflected may be calculated by Equation 2, below.

$TTIT$=Distance to collision area entrance point/ (speed of other vehicle*(1+$V2I$Factor))

$TTET$=(Distance to collision area entrance point+ length of other vehicle)/(speed of other vehicle* (1+$V2I$Factor)) [Equation 2]

In this case, there may be a time for which the vehicle 1 and the other vehicle V1 exist together in the collision area, and a case in which the other vehicle V1 collides with the vehicle 1. However, since the present disclosure does not control the other vehicle V1 but controls the vehicle 1 to avoid collision with the other vehicle V1, it may be determined that when the vehicle 1 enters the collision area earlier than the other vehicle V1, there is no collision probability.

FIG. 6 is a graph for describing a traffic light counter factor for calculating a V2I factor in one form of the present disclosure.

Referring to FIG. 6, the V2I factor calculation module 410 of the controller 400 may calculate a traffic light counter factor having different increment rates according to traffic light states. The traffic light counter factor may have a value from 0 to 1, and have different increment rates according to change sections of a traffic light. That is, the traffic light counter factor may have a larger increment rate for a predetermined time section after a traffic light changes to red, than for a time section until the traffic light changes from yellow to red.

The reason why the increment rate of the traffic light counter factor has different values according to change time sections of a traffic light is to reflect a fact that acceleration or deceleration when the traffic light is yellow is different from acceleration or deceleration when the traffic light is red. For example, deceleration by a driver when a traffic light is red may be greater than deceleration by a driver when a traffic light is yellow.

FIG. 7 is a graph for describing a braking distance factor for calculating a V2I factor in one form of the present disclosure.

Referring to FIG. 7, the V2I factor calculation module 410 of the controller 400 may calculate a braking distance factor that varies depending on speed of another vehicle V1. The braking distance factor may be proportional to a difference $D_b-D_t$ between a braking distance $D_b$ according to speed of the other vehicle V1 and an arrival distance $D_t$ by which the other vehicle V1 arrives at a collision prediction point. Generally, the braking distance $D_b$ is known to be proportional to the square of relative speed between the vehicle 1 and the other vehicle V1.

The braking distance factor may have a value from −1 to 1. The difference $D_b-D_t$ between the braking distance $D_b$ and the arrival distance $D_t$ may be set to be equal to or smaller than a distance (±TTIS*Vt) to which the other vehicle V1 can move until the vehicle 1 enters the collision area.

When the braking distance $D_b$ is longer than the arrival distance $D_t$, the other vehicle V1 may arrive at the collision prediction point so as to collide with the vehicle 1, or pass the collision prediction point, even if the other vehicle V1 recognizes the traffic light and decelerates. In this case, the braking distance factor may have a positive (+) value, and accordingly, the V2I factor may also have a positive (+) value.

When the braking distance $D_b$ is shorter than the arrival distance $D_t$, the other vehicle V1 may stop before arriving at the collision prediction point, if the other vehicle V1 recognizes the traffic light and decelerates. In this case, the braking distance factor may have a negative (−) value, and accordingly, the V2I factor may also have a negative (−) value.

The V2I factor may be defined as follows:

*V2I*Factor=Traffic Light counter Factor*Braking Distance Factor

Figure 8:
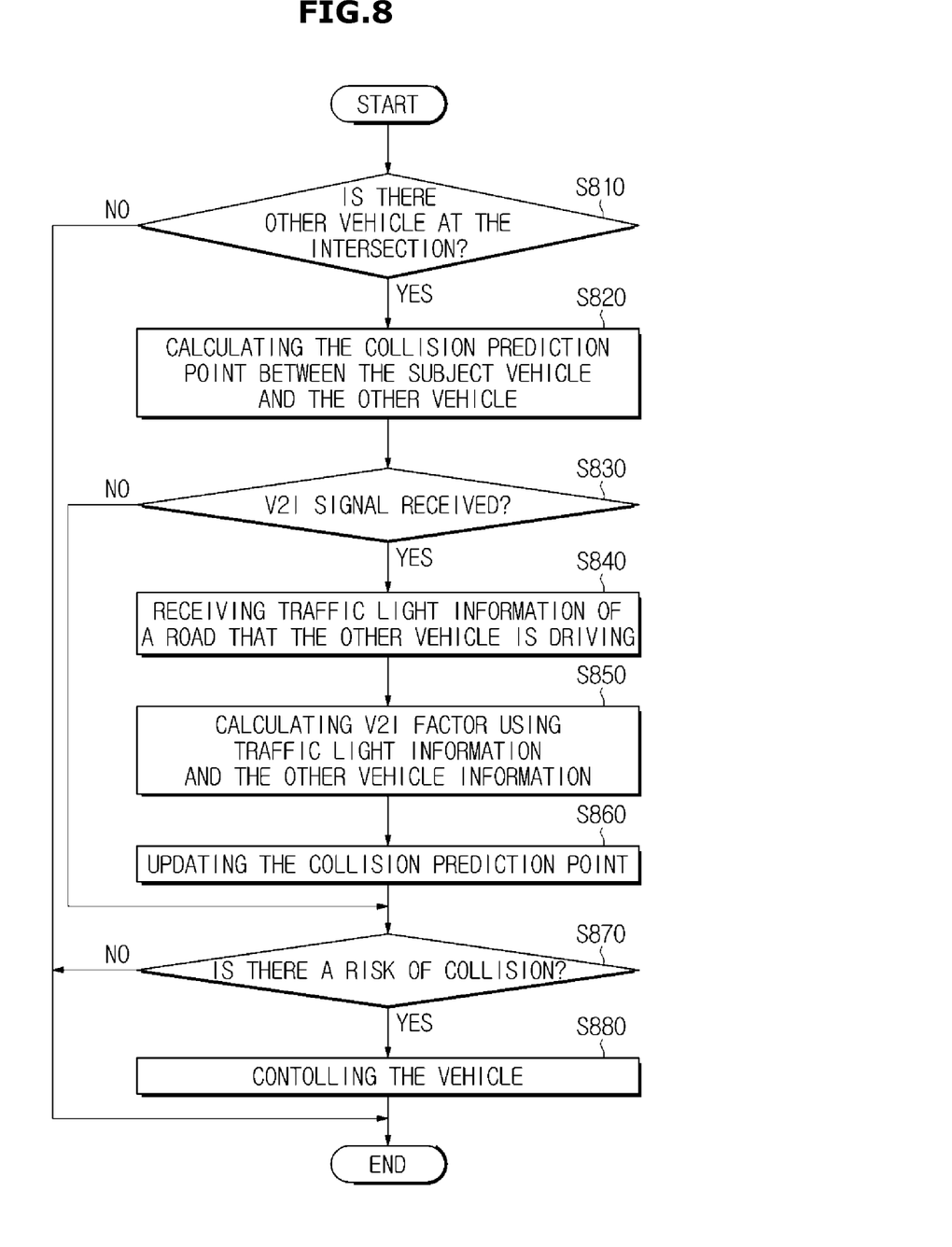
FIG. 8 is a flowchart illustrating a control method of a vehicle.

FIG. 8 is a flowchart illustrating a control method of a vehicle in one form of the present disclosure.

As described above, the vehicle 1 may include the communication device 200, the radar 310, the controller 400, and the driving device 500.

Referring to FIG. 8, the radar 310 may sense another vehicle V1 traveling in a direction intersecting a direction in which the vehicle 1 travels (S810) (namely, the direction of the another vehicle V1 intersects the direction of the vehicle 1). When the other vehicle V1 is sensed, the controller 400 may calculate a collision prediction point based on speed information of the vehicle 1 and speed information of the other vehicle V2 (S820). The controller 400 may set a collision area in which the vehicle 1 may collide with the other vehicle V1, and calculate a collision prediction point within the collision area.

Thereafter, the vehicle 1 may enter an area in which it can transmit and receive data to and from a road infrastructure, and receive a signal from the road infrastructure (S830). At this time, the vehicle 1 may receive traffic light state information of a road on which the other vehicle V1 travels from the road infrastructure through the communication device 200 (S840). The controller 400 may calculate a V2I factor based on the traffic light state information and speed information of the other vehicle V1, and predict an acceleration or deceleration intention of the other vehicle V1 using the V2I factor (S850). Then, the controller 400 may update a collision prediction point by reflecting the acceleration or deceleration intention of the other vehicle V1 (S860), and determine whether there is a collision probability (S870). If the controller 400 determines that there is a collision probability, the controller 400 may generate a vehicle control signal, and the driving device 500 may control the vehicle 1 under the control of the controller 400 (S880).

Since a method of calculating the V2I factor and a method of determining the probability of collision have been described above, a detailed description thereof will be omitted.

According to the vehicle and the control method thereof, it is possible to increase the accuracy of a determination on a probability of collision with another vehicle traveling in an intersecting direction, and to raise a driver's safety, by predicting an acceleration or deceleration intention of the other vehicle according to a traffic light state and reflecting the acceleration or deceleration intention of the other vehicle to a determination on a collision probability.

Meanwhile, the above-described forms may be embodied in the form of recording medium to store commands executable by a computer. The commands may be stored in the form of program codes, and when executed by a processor, the commands can create a program module to perform operations of the forms. The recording medium may be embodied as computer-readable recording medium.

The computer-readable recording medium may include all kinds of recording media storing commands that can be decoded by a computer. For example, the computer-readable recording medium may be Read Only Memory (ROM), Random Access Memory (RAM), a magnetic tape, a magnetic disk, flash memory, an optical data storage device, or the like.

Although a few forms of the present disclosure have been shown and described, it would be appreciated by those skilled in the art that changes may be made in these forms without departing from the principles and spirit of the disclosure.

What is claimed is:
1. A vehicle comprising:
a communication device configured to receive traffic light state information from a road infrastructure;
a radar configured to sense speed of another vehicle traveling in an intersecting direction; and
a controller configured to:
determine a probability of collision with the another vehicle based on the traffic light state information received by the communication device and speed information of the another vehicle detected by the radar, predict an acceleration or deceleration intention of the another vehicle based on a change in the speed of the another vehicle according to a change of the traffic light state, and reflect the acceleration or deceleration intention of the another vehicle and determine probability of collision with the another vehicle.

2. The vehicle according to claim 1, wherein the controller is configured to determine that an amount of acceleration or deceleration of the another vehicle measured when a traffic light changes to red is greater than an amount of acceleration or deceleration of the another vehicle measured when the traffic light changes to yellow.

3. The vehicle according to claim 1, wherein the controller is configured to set a collision area in which the vehicle is able to collide with the another vehicle, and predict the acceleration or deceleration intention of the another vehicle in the collision area.

4. The vehicle according to claim 1, wherein the controller is configured to calculate a collision prediction point based on the speed information of the another vehicle before the communication device receives the traffic light state information.

5. The vehicle according to claim 4, wherein the controller is configured to calculate a Vehicle-to-Infrastructure (V2I) factor using a traffic light counter factor having different increment rates based on traffic light states and a braking distance factor varying based on the speed of the another vehicle, and the controller is configured to predict the acceleration or deceleration intention of the another vehicle based on the V2I factor.

6. The vehicle according to claim 5, wherein the controller is configured to determine that the another vehicle has an acceleration intention when the V2I factor has a positive value, and that the another vehicle has a deceleration intention when the V2I factor has a negative value.

7. The vehicle according to claim 5, wherein the traffic light counter factor has a larger increment rate for a predetermined time section after a traffic light changes to red, than for a time section until the traffic light changes from yellow to red.

8. The vehicle according to claim 5, wherein the braking distance factor is proportional to a difference between a braking distance based on the speed of the another vehicle and an arrival distance by which the another vehicle arrives at the collision prediction point.

9. The vehicle according to claim 5, wherein the controller is configured to update the collision prediction point by reflecting the acceleration or deceleration intention of the another vehicle.

10. The vehicle according to claim 1, further comprising a warning device configured to inform a collision risk under control of the controller.

11. A control method of a vehicle, comprising the steps of:
receiving, by a communication device of the vehicle, traffic light state information from a road infrastructure;
sensing, by a sensor of the vehicle, speed of another vehicle traveling in an intersecting direction; and
determining, by a controller of the vehicle, a probability of collision with the another vehicle based on the traffic light state information and speed information of the another vehicle,
wherein the determining of the probability of collision with the another vehicle further comprises:

predicting, by the controller, an acceleration or deceleration intention of the another vehicle based on a change in speed of the another vehicle based on a change in state of the traffic light; and determining, by the controller, the probability of collision with the another vehicle by reflecting the acceleration or deceleration intention of the another vehicle.

12. The method according to claim 11, wherein the predicting of the acceleration or deceleration intention of the another vehicle comprises:
determining, by the controller, that an amount of acceleration or deceleration of the another vehicle measured when a traffic light changes to red is greater than an amount of acceleration or deceleration of the another vehicle measured when the traffic light changes to yellow.

13. The method according to claim 11, wherein the predicting of the acceleration or deceleration intention of the another vehicle further comprises:
setting, by the controller, a collision area in which the vehicle is able to collide with the another vehicle, and predicting the acceleration or deceleration intention of the another vehicle in the collision area.

14. The method according to claim 11, further comprising:
calculating, by the controller, a collision prediction point based on the speed information of the another vehicle before the communication device receives the traffic light state information.

15. The method according to claim 14, wherein the predicting of the acceleration or deceleration intention of the another vehicle further comprises:
calculating, by the controller, a Vehicle-to-Infrastructure (V2I) factor based on a traffic light counter factor having different increment rates based on traffic light states and a braking distance factor varying based on the speed of the another vehicle; and
predicting, by the controller, the acceleration or deceleration intention of the another vehicle based on the V2I factor.

16. The method according to claim 15, wherein the predicting of the acceleration or deceleration intention of the another vehicle further comprises:
determining, by the controller, that the another vehicle has an acceleration intention when the V2I factor has a positive value and that the another vehicle has a deceleration intention when the V2I factor has a negative value.

17. The method according to claim 15, wherein the traffic light counter factor has a larger increment rate for a predetermined time section after the traffic light changes to red, than for a time section until the traffic light changes from yellow to red.

18. The method according to claim 15, wherein the braking distance factor is proportional to a difference between a braking distance based on the speed of the another vehicle and an arrival distance by which the another vehicle arrives at the collision prediction point.

19. The method according to claim 15, further comprising,
updating, by the controller, the collision prediction point by reflecting the acceleration or deceleration intention of the another vehicle.

* * * * *